United States Patent Office 3,005,237
Patented Oct. 24, 1961

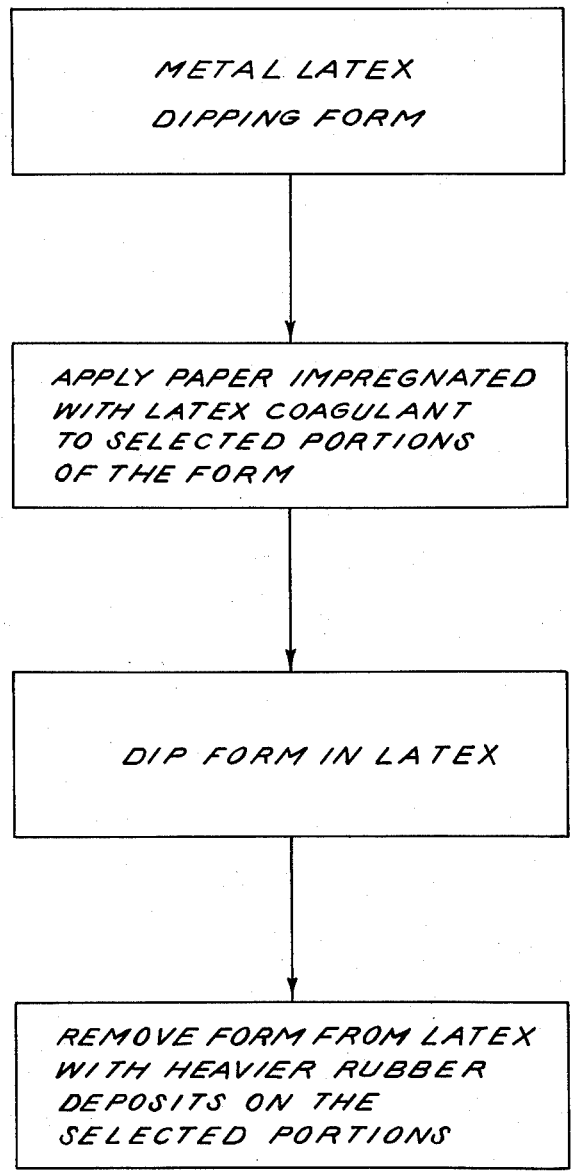

3,005,237
METHOD OF PRODUCING LATEX DIPPED ARTICLES
Everett V. Anderson, Bethany, Conn., assignor to United States Rubber Company, New York, N.Y., a corporation of New Jersey
Filed Mar. 13, 1959, Ser. No. 799,084
12 Claims. (Cl. 18—58.6)

This invention relates to a method of producing latex dipped articles having heavier deposits of rubber in selected portions of the articles than in other portions of the articles. These heavier deposits of rubber may serve as reinforced areas if desired or may be for decorative effects.

The art of making latex dipped rubber articles is well known. A form which may be made entirely of water impermeable material, e.g. metal, plastic, rubber, or glazed porcelain, or the outer layer only of which may be made of such water impermeable material, may be dipped into latex, removed, and the latex adhering to the form dried, and the operations of dipping and drying repeated until the desired thickness of rubber deposit has been built up. The form may be dipped in latex, removed, dipped in a coagulant for the latex, and then dipped again in latex whereby thicker deposits of rubber will be built up by diffusion of the coagulant into the latex, and, if desired, the operations repeated until the required thickness of rubber deposit has been built up. The form may initially be dipped into a coagulant for the latex, and then into the latex and allowed to remain in the latex until a definite thickness of rubber deposit has been built up on the surface of the form and, if desired, the operations repeated until the required thickness of deposit has been built up. Dipping forms of water permeable or porous material, e.g. unglazed porcelain or paper have also been used in similar dipping operations. The present invention relates to the method of producing latex dipped articles on the water impermeable surface of dipping forms. A previously vulcanized latex may be used in which case the dried article is vulcanized, or the latex may be vulcanizable latex prepared by compounding with vulcanizing ingredients so that the final rubber articles may be vulcanized by heating before or after being stripped from the form.

In the fabrication of certain rubber articles by latex dipping it is desirable to have the rubber heavier in some specified areas than in others. For instance, in dipping rubber bathing caps it is advantageous to have the rubber heavier in the area where the chin strap is attached, since the rubber is more apt to tear in service at this point. Also in the fabrication of latex dipped girdles it is desirable to have thicker deposits of rubber at certain points to provide better shape retaining characteristics. In some cases where the girdles are fabricated with detachable garters it is necessary to provide reinforced areas on the garment where the garters are attached. Known methods of obtaining selected heavier deposits of rubber have been to apply a solution of a latex coagulant to selected portions of the dipping form without applying coagulant to the remaining portions, or to apply more coagulant or a stronger coagulant to selected portions where coagulant is also applied to other portions or to the whole surface of the form, and then to dip the thus treated form into latex and allow it to remain in the latex until the desired thickness of rubber deposit has been built up on the coagulant treated portions, after which the form is removed and subjected to the conventional operations such as drying and repeated latex dipping and drying, or such as dipping in coagulant and again in latex and drying, with or without additional dipping in coagulant and latex before drying, to produce the final latex dipped article. The coagulant solution may be applied to the selected portions of the form by brushing or spraying or transferring from another surface, as described in Szegvari U.S. Patent No. 1,989,717, or by stamping or printing a stronger coagulant solution on selected portions of the surface of a form previously dipped in a weaker coagulant solution as described in LEE U.S. Patent No. 2,053,-371, or by transferring to the form a solution of the coagulant from a pad of absorbent material of the shape of the portions of the article to be reinforced which is saturated with a solution of the coagulant as described in Rosenberg U.S. Patent No. 2,806,257, or by spraying or brushing a solution of the coagulant over a stencil or template onto the surface of the form.

These methods of applying the coagulant directly to the selected portions of the dipping form have certain technical deficiencies in practice, particularly in the case of water impervious forms such as metal forms. In some cases, an inordinately long dwelltime in the latex is necessary to build up the required thickness of rubber required in the reinforced area regardless of the strength of the coagulant because of the limited amount of coagulant solution that can be applied to the surface of the form. In dipping the forms in and out of the latex, the coagulant applied directly to the selected portions of the surface of the water impervious forms tends to ooze or seep downward during the latex dwell causing irregular buildup, cracked deposits and loss of detail. These disadvantages have been overcome by the method of the present invention.

According to the present invention, an absorbent medium, such as fibrous sheet material, e.g. absorbent paper or fabric, impregnated with a latex coagulant is applied to the selected portions of the water impermeable surface of the form, the form with the impregnated fibrous sheet material thereon is dipped into the latex and allowed to remain until a deposit of rubber of the desired thickness has been built up on the impregnated fibrous material, and thereafter the form is removed from the latex. This is illustrated in the accompanying flow sheet. The form with the latex deposit adhering to the surface is subjected to the conventional operations of drying and additional latex dipping and drying to build up the desired thickness of the body of the article, or dipping in coagulant and again in latex and drying with or without additional dippings in coagulant and latex before drying, to produce the final latex dipped article.

In carrying out the invention, the absorbent paper or other fibrous sheet material is cut or died out to the shape of the reinforcing area desired. It is then saturated with coagulant solution and stuck to the area of the form where build-up of the rubber is desired. If desired large sheets of the absorbent paper may be saturated with coagulant and dried and patches may be cut or stamped from this sheet when desired for use. The patches impregnated with the dry coagulant may be wet with water for application to the form. Being wet, the paper adheres to the form without difficulty and the form is now ready for dipping. Under commercial dipping conditions where several forms are dipped simultaneously and must be treated before dipping with coagulant patches, some drying out of the patches may occur with loss of adhesion. This can be taken care of by including a humectant such as glycerine in the coagulant.

The latex has no tendency to penetrate the absorbent coagulant patch on contact. Instantaneous coagulation of the latex occurs at the latex-coagulant patch interface preventing any penetration of latex into the patch. This desirable effect permits easy separation of the patch from the rubber deposit.

The surface of the coagulant patch is faithfully reproduced on the surface of the rubber in contact with it.

This can be used to provide decorative effects on the rubber if desired. For instance, if an absorbent paper whose surface is scored or embossed is used, the obverse of this surface will be reproduced on the rubber.

An added advantage to the method of applying coagulant according to the present invention is that coagulant patches may be conveniently inserted into recessed areas on the surface of the form. It is difficult to apply coagulant to a recessed area by spraying or other conventional means. Recessing on the form is necessary for certain effects when articles are dipped in reverse, i.e. the surface in contact with the form becomes the outer surface of the article. Latex dipped girdles are dipped in reverse in order to allow the application of flock to the outer surface of the deposit which becomes the inner surface of the garment. Recessed areas on a dipping form can serve a number of useful purposes. For instance, a reinforcing area can be recessed the exact thickness of the absorbent patch making the latter exactly flush with the adjacent surface of the form. When this is done, the reinforced area that is built up on the garment will be even with the rest of the garment when it is turned inside out. In another instance, the recessed area may be cut relatively deep, say .050" in from the surface of the form. Placing a coagulant patch .008" thick at the bottom of this cut-out may cause a build-up of .042" which will be that much higher than the surrounding surface when the garment is reversed. It goes without saying that such recessed areas on the form provide convenient guides for locating the coagulant patches.

The following examples illustrate the invention. All parts and percentages referred to herein are by weight.

*Example 1*

A square piece of absorbent laboratory filter paper cut to dimensions of 1½" by 1½" and having a thickness of 0.008" was placed in the center of a flat rectangular aluminum dipping test plate or form that measured 5" by 3½" by ⅛" thick. Twelve drops of coagulant solution (weighing 0.57 gram) were then placed on the paper. The coagulant solution was a 70% aqueous solution of calcium nitrate tetrahydrate containing 1% of a non-ionic surface-active agent (condensation product of ethylene oxide and a long chain fatty alcohol) to aid in wetting the paper with the coagulant solution. The filter paper rapidly absorbed the coagulant solution by capillary attraction and the coagulant evenly distributed through the paper. Being thoroughly wetted, the paper adhered to the surface of the test form with sufficient force that it was not displodged when the plate was immersed in latex. The form was then dipped in a natural latex conventionally used for dipping and allowed to remain ten minutes. On withdrawal, coagulating the adhering latex by dipping the form in a 5% solution of calcium nitrate tetrahydrate in denatured ethyl alcohol, drying and measuring the thickness of deposited rubber, the following was observed: Where the coagulant treated paper had been located on the form the rubber measured 0.06" in thickness. Over the rest of the form the rubber measured about .004" in thickness. It is evident from this that the coagulant in the absorbent patch caused .056" of rubber to deposit.

*Example 2*

This example compares directly the reinforcement obtained by the present invention and the prior practice of applying the coagulant solution directly to the surface of the form. A circular piece of filter paper 2" in diameter was saturated with a 70% aqueous solution of calcium nitrate tetrahydrate and the coagulant saturated paper applied to the center of one surface of a flat aluminum dipping test form similar to the form used in Example 1. A coagulant solution consisting of 35% calcium nitrate tetrahydrate dissolved in denatured ethyl alcohol was then applied in a 2" diameter circle directly onto the other surface of the form by padding it on the surface of the form with a felt pad saturated with the coagulant solution. The solubility of calcium nitrate is less in alcohol than in water, and 35% calcium nitrate represents about the maximum concentration of the salt in alcohol that is feasible. It is not practical to apply a water based coagulant directly to the form by the prior art method of padding, spraying or painting. The reason for this is that the surface tension of water coagulants are such as to prevent even deposition on the form. What happens is the coagulant acts like water on a waxed surface and even deposition of rubber on the form is not obtained. When alcoholic coagulants are applied directly to the surface of the form, however, they "wet" the form smoothly and leave an even deposit of calcium nitrate. The thus treated form was dipped in natural latex, allowed to remain ten minutes in the latex, removed, dipped in a 5% solution of calcium nitrate tetrahydrate in denatured ethyl alcohol to coagulate the latex deposits, and the coagulated rubber deposits were then dried. The rubber deposited on the face of the plate to which the coagulant had been directly applied had a thickness of 0.036" whereas the rubber deposited on the coagulant treated paper had a thickness of 0.053". The rubber deposited on the untreated portions of the plate had a thickness of about 0.005". The test was repeated with a dwell in the latex of twenty minutes instead of 10 minutes. The rubber deposited on the face of the plate to which the coagulant had been directly applied had a thickness of 0.057" whereas the rubber deposited on the coagulant treated paper had a thickness of 0.081". The rubber deposited on the untreated portions of the plate had a thickness of about 0.005".

*Example 3*

A full size flat aluminum girdle form was used. Absorbent paper patches saturated with a 70% aqueous solution of calcium nitrate tetrahydrate as used in Example 1 were applied to the four garter areas and another paper patch similarly impregnated with the coagulant was applied to the waist area where reinforcement was desired. The form with the coagulant impregnated paper thereon was dipped in a natural latex used for dipping and allowed to remain ten minutes to build up the reinforced portions of the deposit, removed, dipped in a coagulant solution of calcium nitrate, removed, dipped again in latex and allowed to remain a couple of minutes, removed and dipped in the calcium nitrate coagulant solution again, and then dipped in latex and the coagulant again, thereby building up the body of the girdle to the required thickness, and also increasing the thickness of the reinforced portions from the first latex dip the same amount as the main body of the material. The thickness of the reinforcements in the final dried girdle where the coagulant impregnated patches had been was about 0.09" and the thickness of the main body of the girdle was about 0.026".

The latices used may be natural rubber latices or latices of synthetic rubber made by emulsion polymerization of synthetic rubber-forming monomers, or may be so-called artificial latices prepared by dispersing solid natural or synthetic rubbers in water in known manner as by incorporating a hydrophilic colloid such as soap or protein or colloidal clay in the masticated rubber and then adding water gradually while masticating the batch until the water becomes the continuous phase with the rubber dispersed in the artificially prepared latex, or may be mixtures of these various latices. The polymerizable material in the preparation of emulsion polymerized synthetic rubber latex may be one or a mixture of butadienes-1,3, for example, butadiene-1,3, isoprene, chloroprene, piperylene, 2,3-dimethyl butadiene-1,3. The polymerizable material, as is known, may be a mixture of one or more such butadienes with one or more polymerizable compounds which are capable of forming rubber copolymers with butadienes-1,3, for example, up to 70% of such mixture of one or more compounds which contain a single CH₂=C< group where at least one of the disconnected valences is attached to an electro-negative group, that is, a group which substantially increases the electrical dissymmetry or polar character of the molecule. Examples of such monoolefins containing a terminal methylene (CH₂=C<) group and are copolymerizable with butadienes-1,3 are aryl olefines, such as styrene, vinyl naphthylene; alpha-methyl styrene, para chlorostyrene, dichlorostyrene, alpha-methyl dichlorostyrene; the alpha-methylene carboxylic acids and their esters, nitriles and amides, such as acrylic acid, methyl acrylate, methyl methacrylate, acrylonitrile, methacrylonitrile, methacrylamide; methyl vinyl ether; methyl vinyl ketone; vinylidine chloride; alpha, beta and gamma vinyl pyridines, 5-ethyl-2-vinyl pyridine, 2-methyl-5-vinyl pyridine, vinyl carbazole. Such a synthetic rubber latex may generically be termed a "butadiene polymer synthetic rubber latex." The solid synthetic rubbers that may be dispersed in water to form artificial latices are butadiene polymer synthetic rubbers coagulated from the above-mentioned butadiene polymer synthetic rubber latices. Also artificial latices may be prepared from synthetic rubbers that were originally made in solid form without going through a latex stage, for example, butyl rubber which is prepared by the polymerization of a mixture of a major proportion of an isoolefine such as isoprene and a minor proportion (0.5 to 15 percent) of a conjugated diene such as isoprene or butadiene-1,3 in the presence of a Friedel-Crafts polymerization catalyst of the type of aluminum chloride or boron trifluoride. The latices may also be artificial latices prepared from crude or reclaimed natural rubber. For highest quality rubber articles, natural rubber latex is used. The coagulants for impregnating the fibrous sheet material may be materials that reduce the pH of the latex, e.g. acids such as acetic hydrochloric or sulfuric acid, or materials that release polyvalent metal ions in the latex, e.g. polyvalent metal salts, such as calcium chloride, calcium nitrate or zinc chloride, or materials that coagulate the latex by dehydration, e.g. alcohols such as methyl, ethyl or isopropyl alcohol. Such latices and coagulants are well known and their preparation or use per se form no part of the present invention.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. In the method of producing a latex dipped article having heavier deposits of rubber in selected portions of the article than in other portions of the article, the steps comprising applying to selected portions of the water impermeable surface of a dipping form fibrous sheet material impregnated with a latex coagulant, dipping the form with the coagulant impregnated fibrous sheet material thereon into latex, and thereafter removing the form from the latex.

2. In the method of producing a latex dipped article having heavier deposits of rubber in selected portions of the article than in other portions of the article, the steps comprising positioning in recessed areas on the water impermeable surface of a dipping form fibrous sheet material impregnated with a latex coagulant, dipping the form with the coagulant impregnated fibrous material thereon into latex, and thereafter removing the form from the latex.

3. In the method of producing a latex dipped article having heavier deposits of rubber in selected portions of the article than in other portions of the article, the steps comprising applying to selected portions of the water impermeable surface of a dipping form fibrous sheet material impregnated with a latex coagulant, dipping the form with the coagulant impregnated fibrous sheet material thereon into latex, allowing the form to remain in the latex until the desired thickness of rubber deposit has been built up on the coagulant impregnated fibrous material, and thereafter removing the form from the latex.

4. In the method of producing a latex dipped article having heavier deposits of rubber in selected portions of the article than in other portions of the article, the steps comprising positioning in recessed areas on the water impermeable surface of a dipping form fibrous sheet material impregnated with a latex coagulant, dipping the form with the coagulant impregnated fibrous material thereon into latex, allowing the form to remain in the latex until the desired thickness of rubber deposit has been built up on the coagulant impregnated fibrous material, and thereafter removing the form from the latex.

5. The method of claim 3 in which the latex is a natural latex.

6. The method of claim 4 in which the latex is a natural latex.

7. In the method of producing latex dipped articles having heavier deposits of rubber in selected portions of the article than in other portions of the article, the steps comprising applying to selected portions of the surface of a metal dipping form paper impregnated with a latex coagulant, dipping the form with the coagulant impregnated paper thereon into latex, allowing the form to remain in the latex until the desired thickness of rubber deposit has been built up on the coagulant impregnated paper, and thereafter removing the form from the latex.

8. In the method of producing latex dipped articles having heavier deposits of rubber in selected portions of the article than in other portions of the article, the steps comprising positioning in recessed areas on the surface of a metal dipping form paper impregnated with a latex coagulant, dipping the form with the coagulant impregnated paper thereon into latex, allowing the form to remain in the latex until the desired thickness of rubber deposit has been built up on the coagulant impregnated paper, and thereafter removing the form from the latex.

9. In the method of producing latex dipped articles having heavier deposits of rubber in selected portions of the article than in other portions of the article, the steps comprising applying to selected portions of the surface of a metal dipping form paper impregnated with a latex coagulant, dipping the form with the coagulant impregnated paper thereon into natural latex, allowing the form to remain in the latex until the desired thickness of rubber deposit has been built up on the coagulant impregnated paper, and thereafter removing the form from the latex.

10. In the method of producing latex dipped articles having heavier deposits of rubber in selected portions of the article than in other portions of the article, the steps comprising positioning in recessed areas on the surface of a metal dipping form paper impregnated with a latex coagulant, dipping the form with the coagulant impregnated paper thereon into natural latex, allowing the form to remain in the latex until the desired thickness of rubber deposit has been built up on the coagulant impregnated paper, and thereafter removing the form from the latex.

11. In the method of producing latex dipped articles having heavier deposits of rubber in selected portions of the article than in other portions of the article, the steps comprising applying to selected portions of the surface of a metal dipping form paper impregnated with a latex coagulant comprising calcium nitrate, dipping the form with the coagulant impregnated paper thereon into natural latex, allowing the form to remain in the latex until the desired thickness of rubber deposit has been built up on the coagulant impregnated paper, and thereafter removing the form from the latex.

12. In the method of producing latex dipped articles having heavier deposits of rubber in selected portions of the article than in other portions of the article, the steps comprising positioning in recessed areas on the surface of a metal dipping form paper impregnated with a latex coagulant comprising calcium nitrate, dipping the form with the coagulant impregnated paper thereon into natural latex, allowing the form to remain in the latex until the desired thickness of the rubber deposit has been built up on the coagulant impregnated paper, and thereafter removing the form from the latex.

References Cited in the file of this patent

UNITED STATES PATENTS

| | | |
|---|---|---|
| 1,193,883 | Emery | Aug. 8, 1916 |
| 1,804,920 | Edwards | May 12, 1931 |
| 1,825,736 | Klein et al. | Oct. 6, 1931 |
| 1,924,214 | Newton | Aug. 29, 1933 |
| 1,955,840 | Trobridge | Apr. 24, 1934 |
| 1,989,717 | Szegvari | Feb. 5, 1935 |
| 1,994,763 | Gardner | Mar. 19, 1935 |
| 2,028,797 | Miller | Jan. 28, 1936 |
| 2,266,263 | Raiche | Dec. 16, 1941 |
| 2,268,678 | Tingey | Jan. 6, 1942 |
| 2,642,628 | Zimmerman | June 23, 1953 |
| 2,806,257 | Rosenberg | Sept. 17, 1957 |